(12) United States Patent
Zirk et al.

(10) Patent No.: US 7,008,076 B2
(45) Date of Patent: Mar. 7, 2006

(54) FOLDING KNIFE LIGHT TOOL

(76) Inventors: Jason E. Zirk, 344 Gravels Rd., Harrisonburg, VA (US) 22802; Darren Kady, 3900 Springfield Rd., Glen Allen, VA (US) 23060

( * ) Notice: Subject to any disclaimer, the term of this patent is extended or adjusted under 35 U.S.C. 154(b) by 0 days.

(21) Appl. No.: 10/780,855

(22) Filed: Feb. 19, 2004

(65) Prior Publication Data

US 2004/0187313 A1 Sep. 30, 2004

Related U.S. Application Data

(60) Provisional application No. 60/451,544, filed on Mar. 3, 2003.

(51) Int. Cl.
*B25B 23/18* (2006.01)
(52) U.S. Cl. .......................... 362/119; 362/120; 30/159
(58) Field of Classification Search ........ 362/119–120; 30/158–159
See application file for complete search history.

(56) References Cited

U.S. PATENT DOCUMENTS

| | | | | |
|---|---|---|---|---|
| 2,599,419 A | * | 6/1952 | Stark .......................... | 362/185 |
| 2,705,279 A | * | 3/1955 | Berlinger .................... | 362/197 |
| 4,023,221 A | | 5/1977 | Cadman | |
| 4,364,104 A | * | 12/1982 | Holahan et al. ............ | 362/223 |
| 4,669,186 A | * | 6/1987 | Liu .............................. | 30/125 |
| 4,700,420 A | | 10/1987 | Belanger | |
| 4,703,563 A | | 11/1987 | Hoshino et al. | |
| 4,751,621 A | | 6/1988 | Jenkins | |
| 4,918,775 A | * | 4/1990 | Leu ............................. | 7/168 |
| 5,083,246 A | * | 1/1992 | Lambert ..................... | 362/471 |
| 5,103,520 A | | 4/1992 | Mazzo | |
| 5,168,780 A | * | 12/1992 | Van Gennep ............... | 81/57.29 |
| 5,169,225 A | * | 12/1992 | Palm .......................... | 362/118 |
| 5,199,874 A | * | 4/1993 | Campagnuolo et al. ....... | 434/11 |
| 5,313,376 A | * | 5/1994 | McIntosh .................... | 362/119 |
| 5,331,741 A | * | 7/1994 | Taylor, Jr. ................... | 30/158 |
| 5,402,575 A | * | 4/1995 | Maxcy ........................ | 30/123 |
| 5,442,529 A | * | 8/1995 | Hoover ....................... | 362/119 |
| 5,467,256 A | * | 11/1995 | Chen ........................... | 362/119 |
| 5,474,452 A | * | 12/1995 | Campagnuolo .............. | 434/11 |
| D367,618 S | | 3/1996 | Stewart et al. | |
| 5,588,732 A | * | 12/1996 | Sasaki et al. ................ | 362/10 |
| 5,626,414 A | * | 5/1997 | Chen .......................... | 362/119 |
| 5,652,587 A | * | 7/1997 | Liu ............................. | 341/176 |
| 5,653,525 A | * | 8/1997 | Park .......................... | 362/119 |
| 5,713,135 A | | 2/1998 | Acopulos | |
| 5,727,319 A | * | 3/1998 | Myerchin et al. ............ | 30/123 |
| D397,048 S | | 8/1998 | Herndon | |
| 5,845,986 A | * | 12/1998 | Breen ........................ | 362/119 |
| 5,878,500 A | * | 3/1999 | Emerson .................... | 30/158 |

(Continued)

*Primary Examiner*—Stephen Husar
*Assistant Examiner*—Jason Han
(74) *Attorney, Agent, or Firm*—Robert E. Bushnell, Esq.

(57) ABSTRACT

A folding knife light tool with an ergonometric handle in which an illuminating means whether an LED or light bulb or a laser light is incorporated into the handle housing in the spaces existing between the blade, the locking mechanism, and the handle. A knife handle is provided having a body contoured for the hand. The housing is made from one molded piece with a slit in the middle. The handle includes a pivot point for supporting a blade between the longitudinal sides or scales of the blades. A conventional locking or non-locking system is utilized for keeping the blade open once it is unfolded. When the blade is folded, a portion of the blade extends above the sides of the knife handle for digital engagement in the opening operation.

29 Claims, 6 Drawing Sheets

U.S. PATENT DOCUMENTS

| | | | |
|---|---|---|---|
| D409,102 S | 5/1999 | Balliette | |
| 5,947,789 A * | 9/1999 | Chan | 446/219 |
| 6,027,224 A * | 2/2000 | Schnell | 362/119 |
| 6,041,505 A * | 3/2000 | Chen | 30/123 |
| 6,142,769 A * | 11/2000 | Walker | 431/253 |
| 6,145,994 A * | 11/2000 | Ng | 362/119 |
| 6,206,538 B1 * | 3/2001 | Lemoine | 362/119 |
| 6,273,582 B1 * | 8/2001 | Taggart et al. | 362/119 |
| 6,357,067 B1 | 3/2002 | Jones | |
| 6,394,634 B1 * | 5/2002 | Kitchin | 362/477 |
| 6,434,829 B1 * | 8/2002 | Chen | 30/123 |
| 6,446,341 B1 * | 9/2002 | Wang et al. | 30/125 |
| 6,581,296 B1 | 6/2003 | Ponce | |
| 6,744,223 B1 * | 6/2004 | Laflamme et al. | 315/291 |
| 6,749,318 B1 * | 6/2004 | Palacios | 362/119 |
| 6,761,470 B1 * | 7/2004 | Sid | 362/233 |
| 6,765,496 B1 * | 7/2004 | Dayan | 340/903 |
| 6,787,999 B1 * | 9/2004 | Stimac et al. | 315/51 |
| 2001/0040801 A1 * | 11/2001 | Krietzman et al. | 362/200 |
| 2002/0071270 A1 * | 6/2002 | Lam | 362/109 |
| 2002/0075673 A1 * | 6/2002 | Phelps | 362/119 |
| 2003/0223224 A1 * | 12/2003 | Painsith et al. | 362/119 |
| 2004/0016058 A1 * | 1/2004 | Gardiner et al. | 7/119 |

* cited by examiner

FOLDING KNIFE LIGHT TOOL

CLAIM OF PRIORITY

This application makes reference to, incorporates the same herein, and claims all benefits accruing under 35 U.S.C. §119 from my provisional application SINGLE BODY MULTI-TOOL DEVICE filed with the U.S. Patent & Trademark Office on 3$^{rd}$ Mar. 2003 and there duly assigned Ser. No. 60/451,544.

BACKGROUND OF THE INVENTION

1. Technical Field

The present invention relates generally to folding knives and processes for manufacturing knives, and more specifically to a folding knife incorporating a source of selectively operable illumination.

2. Related Art

Many different types of folding knives are available. Exemplary knives provided with lighting fixtures may be found in such references as U.S. Pat. No. 4,364,104 to Holahan et al., entitled NOVELTYLIGHT, issued on Dec. 14, 1982; U.S. Pat. No. 5,313,376 to McIntosh, entitled MULTIPURPOSEKNIFE/LIGHT, issued on May 17, 1994; U.S. Pat. No. 5,467,256 to Chen, entitled KNIFE WITH LIGHTING FIXTURE, issued on Nov. 14, 1995; U.S. Pat. No. 5,727,319 to Myerchin et al., entitled KNIFE WITH ILLUMINATED BLADE, issued on Mar. 17, 1998; U.S. Pat. No. 4,751,621 to Jenkins, entitled LIGHT KNIFE, issued on Jun. 14, 1988; U.S. Pat. No. 6,434,829 to Chen, entitled KNIFE HAVING A WARNING STRUCTURE, issued on Aug. 20, 2002; and U.S. Pat. No. 5,474,452 to Campagnuolo, entitled TRAINING SIMULATION SYSTEM FOR INDIRECT FIRE WEAPONS SUCH AS MORTARS AND ARTILLERY, issued on Dec. 12, 1995. Some of these knives provide light when a button is pressed, or when the blade is folded open. No knife is currently available that allows the user to choose to operate the flashlight with the knife unfolded, with the knife folded or for automatic illumination when the knife is unfolded.

SUMMARY OF THE INVENTION

It is therefore, one object of the present invention is to provide a knife and a process for manufacturing knives equipped with a source of selectively operable illumination.

It is another object to provide a knife and a process of manufacturing knives with an illumination component that gives the user a choice of operation of the knife with or without illumination.

It is another object to provide a knife and a process for manufacturing knives with the capability to operate an illumination component momentarily.

It is still another object to provide a tool and a process for manufacturing tools equipped with a tool port accommodating any of a number of tools within the housing of the tool.

It is yet another object to provide a tool and a process of manufacturing tools incorporating a mode switch that allows the user to switch between three modes of operation: OFF, ON, and ON-BY-BLADE.

It is still yet another object to provide a tool and a process of manufacturing tools endowed with an ability to enable a user to locate the knife in the dark, if desired.

It is a further object to provide a knife and a process of manufacturing knives that enables the knives to incorporate features that can be utilized in all sizes of knives, from small penknives to large buck-skinning knives.

It is yet a further object to provide a knife and a process of manufacturing knives equipped with a selectively operable source of illumination that can be used with knives that are non-locking, linear-locking, or lock-back locking.

It is still a further object to selectively provide illumination for use of a tool carried in the tool port of this invention when operated or when used in the dark.

It is still yet a further object to provide an armed forces training tool and process for manufacturing the tool by providing an illumination signal that could be utilized as a kill score during commando training.

It is also an object to selectively provide illumination for critical procedures as desired by utilizing the on feature for emergencies such as medical operations.

It is also an object to provide a folding knife light tool and process of manufacturing a tool with an ergonometric handle in which a source of illumination such as an LED or light bulb or a laser light is incorporated into the handle housing in the spaces existing between the blade, the locking mechanism, and the handle.

In accordance with the principles of the present invention, a knife's handle may be configured with a body contoured for the hand. The housing is made from one molded piece with a slit in the middle. The handle includes a pivot point for supporting a blade between the longitudinal sides or scales of the blades. A conventional locking, or alternatively, a non-locking system may be used to keep the knife open once the blade has been unfolded from the handle. When the blade of the knife is folded into the handle, a portion of the blade can extend above the sides of the handle for digital engagement in the opening operation.

A source of illumination or light is attached to the folding knife housing which includes the handle. In one embodiment, the source of illumination such as one or more lights may be fitted into each side of the opened knife to illuminate both sides of the blade and the area near the tip of the blade. In another embodiment, a source of illumination may be provided only on one side of the blade when the blade is opened. An exposed convex magnifying lens may also be mounted flush with the housing of the folding knife.

A reflector may be positioned behind the lens and the source of light for maximum, concentration of light output.

A three position waterproof slide switch may be provided as a mode switch and may be located at the back of the handle of the folding knife in order to provide three modes of operation; OFF, ON, and On-by-blade. A momentary on switch in a microswitch configuration may be provided and placed near the heel of the blade so that when the blade is in an opened position, the light is activated, or toggled on. Additionally, the momentary on switch can be switched to an on position by manual manipulation with either the thumb or finger of the user when the blade is in a closed position and the mode switch is in the ON-by-blade position. Such a momentary switch may be used to momentarily turn off the source of illumination when the blade is in the opened position by using a momentary switch configured with another position for electrically coupling a battery to the source of illumination. Also, a dimming position may be added to the momentary switch in another embodiment. A further feature of switching to another color of illumination can be provided by using different sources of illumination, whether LED's or filtered sources of illumination, emitting different wavelengths. This feature may be activated by utilizing a version of a momentary switch which incorporates additional switching positions.

A waterproof battery compartment may be provided to house miniature batteries within the housing, or within the handle of the knife. Any battery or voltage configuration can be used. Also, any portable power source that can be accommodated by the handle can be used. One embodiment may use the newly available AAAA size battery. The power source or batteries may be removable or alternatively, rechargeable, or a solar powered series of cells, or a solar charged battery. The battery compartment could also be fitted with a screw-on waterproof cap type of cover.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
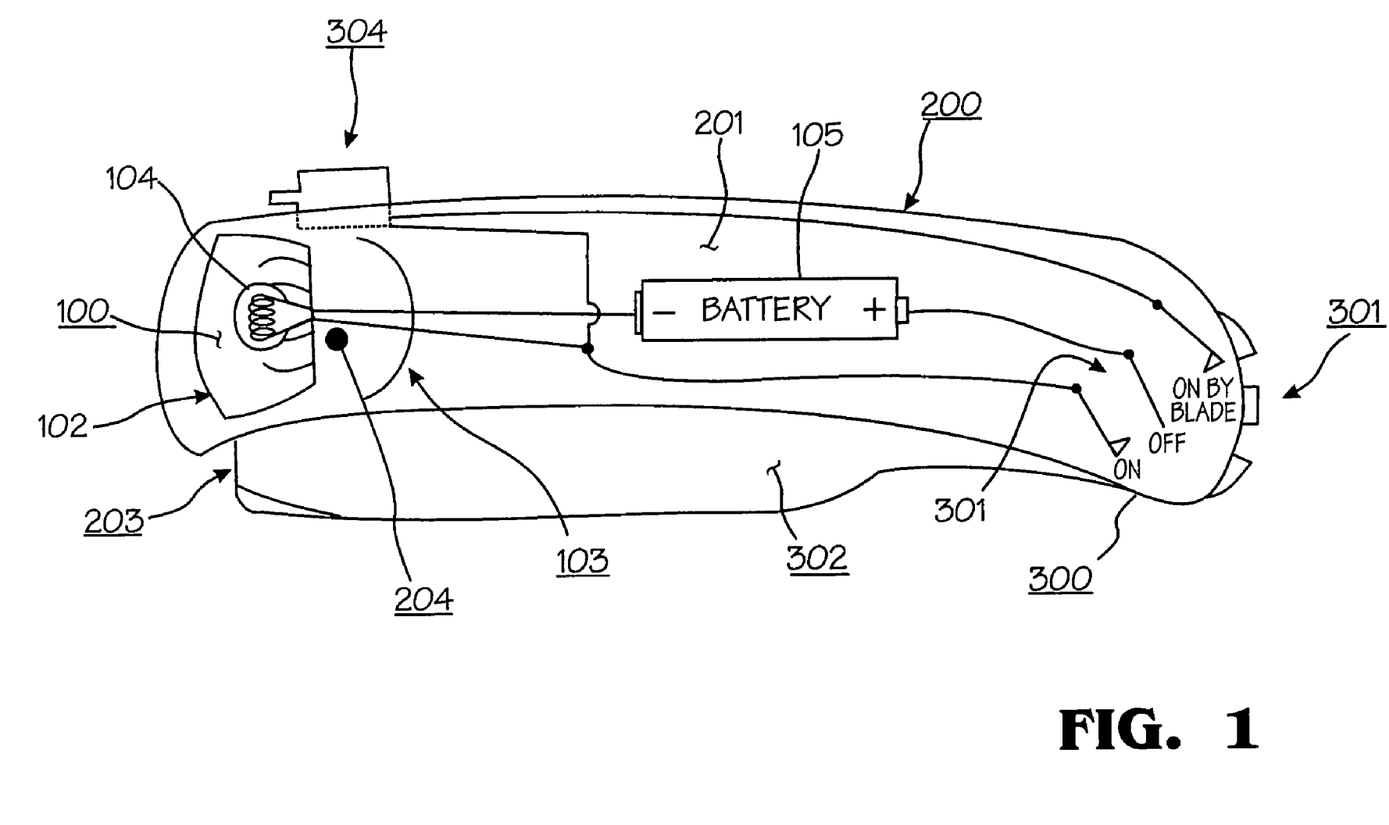
FIG. 1 is a view of the folding knife light tool in a closed position.
Figure 2:
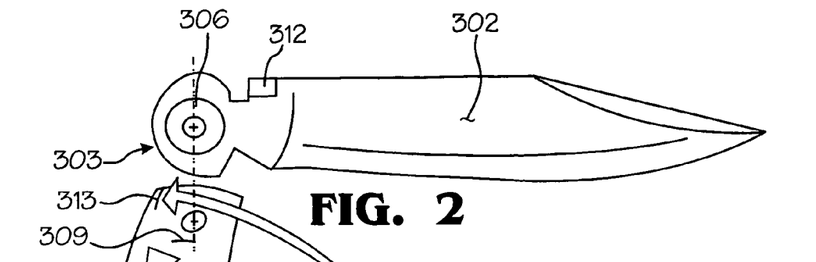
FIGS. 2, 2A and 2B are views of the knife blade switch parts of one embodiment.
Figure 2A:
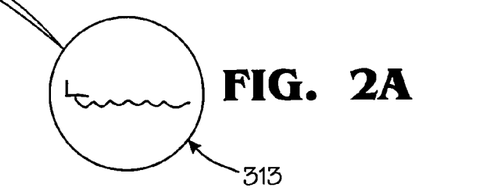
Figure 2B:
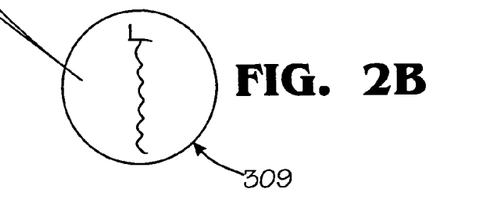
Figures 3, 3A:
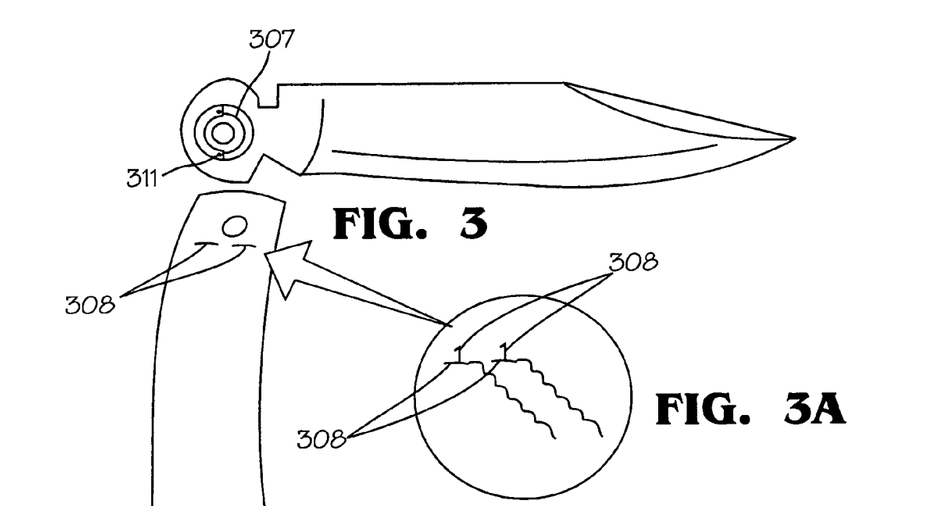
FIGS. 3 and 3A are views of the knife blade switch parts showing the second embodiment of the invention.
Figure 4:
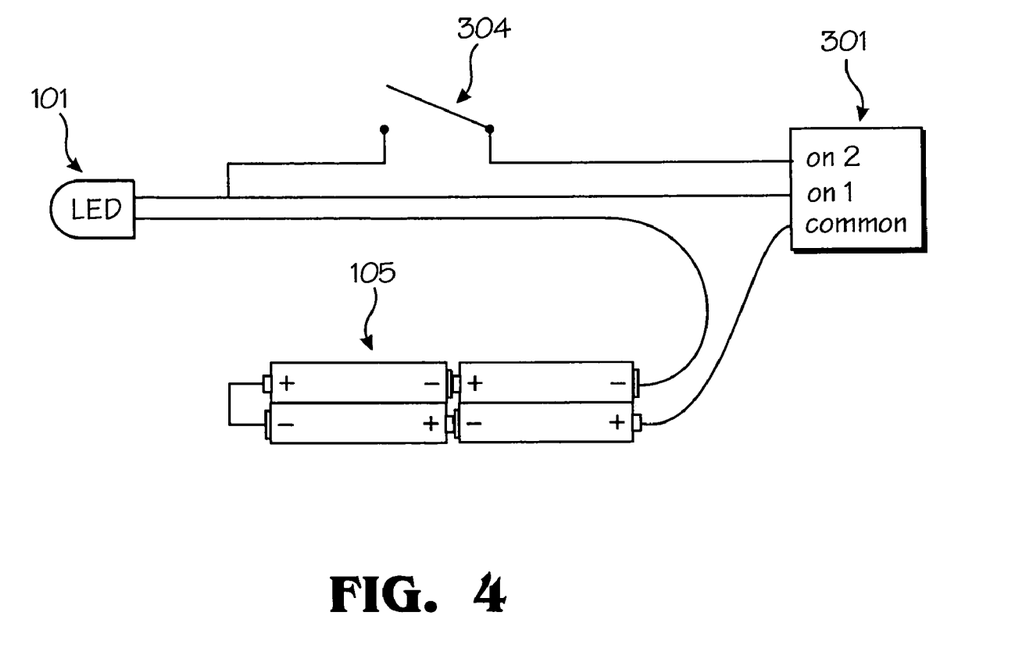
FIG. 4 is a schematic electrical diagram of the folding knife light switches.

With reference to FIG. 1, the folding knife flashlight tool is shown in one embodiment in a folded position. The illuminating component 100, housing component 200, and the blade-switch component 300 comprise the three major components of this embodiment. A illuminator 104 is located behind a lens 102 and in front of a reflector 103 at the pivot axis 204 end of the housing 200. The housing 200 has an ergonometric shape for comfort in usage. The lens 102 can be of a focusing type which is adjustable by any of the adjusting means available in the trade. In another embodiment illustrated by FIG. 5A, a lens 102 is provided on both sides of the extended is blade 302 wherein both sides of the blade 302 are illuminated Referring to FIGS. 1 and 4, a three position waterproof mode switch 301 is positioned at the end of the housing 200 opposite of the light end. Three modes of operation are provided: OFF, ON, and ON-by-blade. In an embodiment of this invention illustrated by FIG. 6, a momentary-on switch 304 is provided and positioned at the pivot axis end of the housing 200 and near a heel of the knife blade 303 so that when the blade 302 is opened the heel portion 303 of the knife blade 302 contacts and acts as a mechanical lever, with heel portion 303 camming, and thus operationally moving the contact wiper of switch 304, and thereby switches the momentary on switch 304 into its electrical ON position, thus electrically coupling a source of electrical power such as drycell penlight battery 105 across the filiment of light bulb 104. This switch 304 will also allow illumination to be used for SOS or other types of distress situations.

Figure 7:
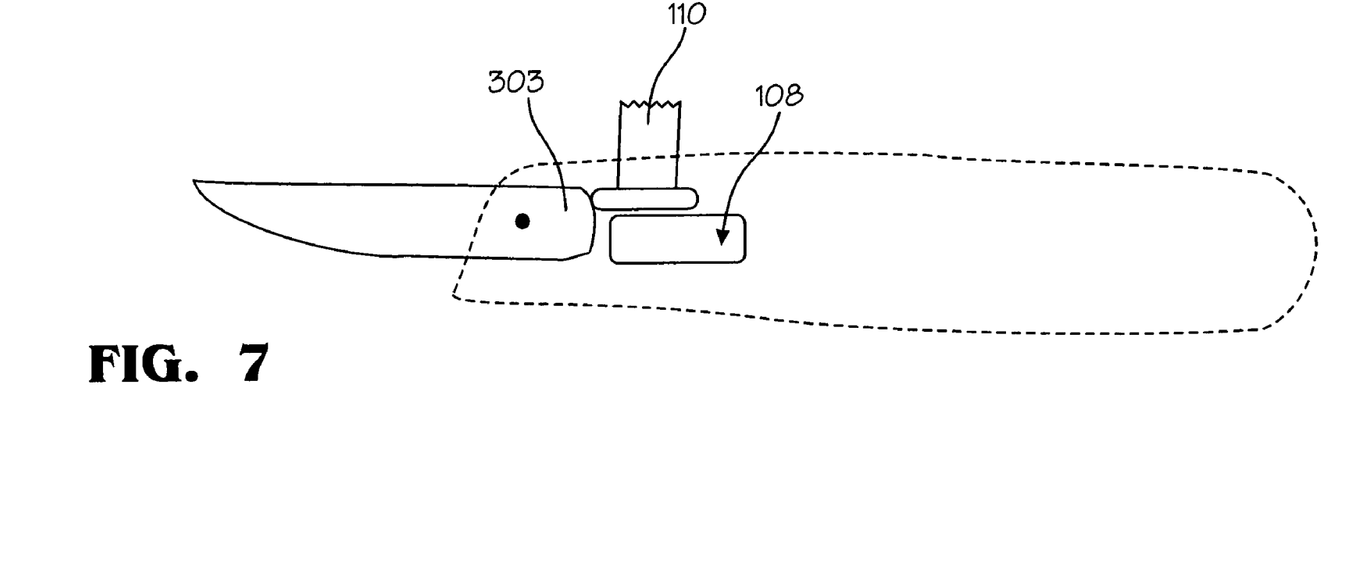
FIG. 7 is a view of the knife blade accommodating an operating magnet and a magnetic reed switch as the first electrical or toggle on switch.

Referring to FIGS. 2, 2A, 2B, 3, and 3A another embodiment utilizes a contact washer 306 and a pressure contact 309 on said washer 306 to establish electrical contact to the mode switch 301 and thereby switch the illumination component 100 when conductive plate 312 contacts contact stud contact 313 on the housing 200. Also another embodiment allows a semicircular contact washer 311 to establish contact with the mode switch 301 and switch on the illuminating component 100, when the blade 302 is opened and semicircular contact washer 311 contacts the two contact studs 308 accommodated into the housing 200 thereby making a circuit and sending power to switch 301. Another switch embodiment involves a switch magnet 110 and a magnetic reed switch 108, referring to FIG. 7, wherein switching of the switch magnet 110 by the heel 303 of the blade 302 as the blade is unfolded to the open position places the switch magnet close to the magnetic reed switch 108 which is then switched on thereby turning on the illuminating component 100.

Figures 5, 5A:
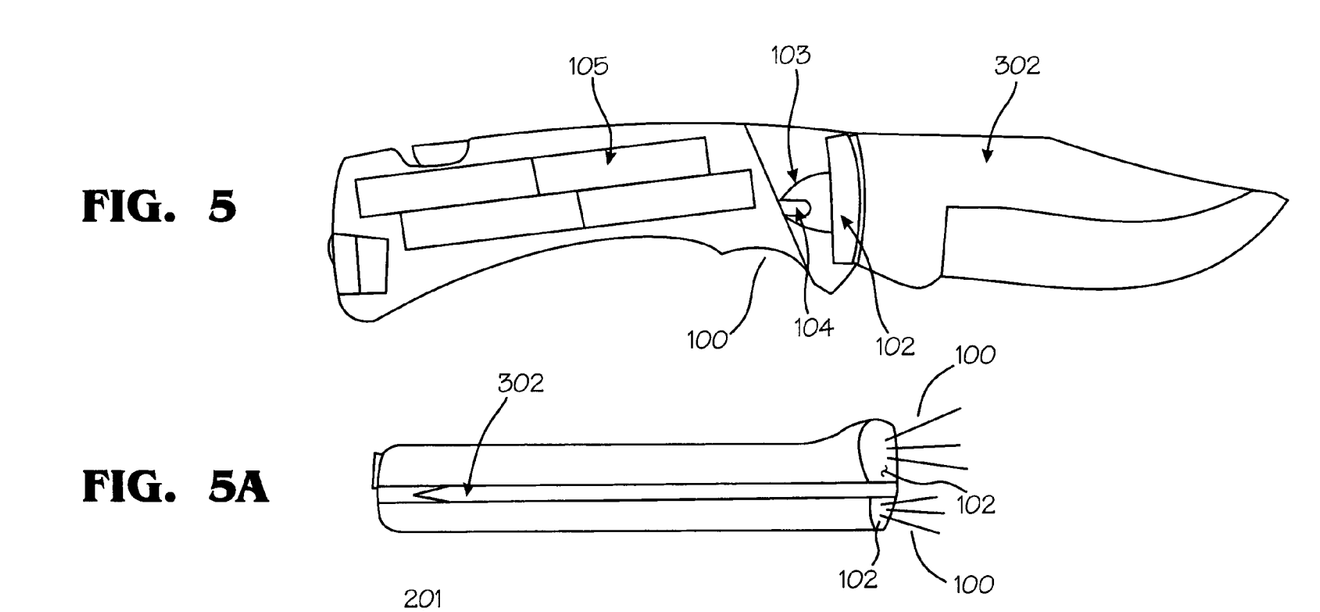
FIGS. 5, 5A and 5B are views of the folding knife light tool in the open position and closed position.
Figure 5B:
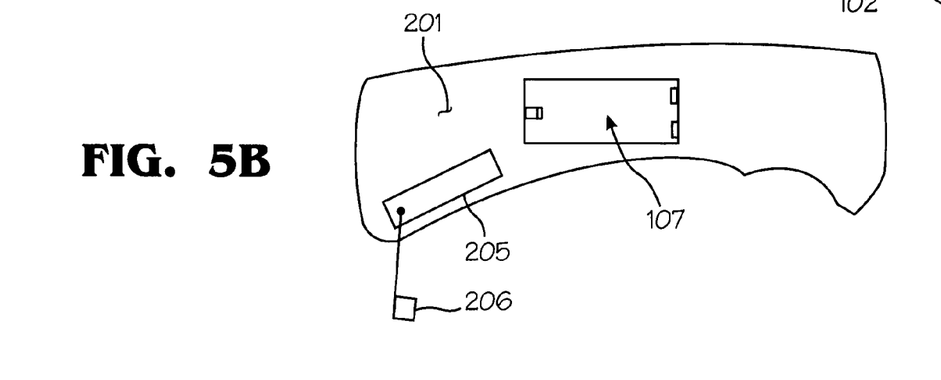
Figure 6:
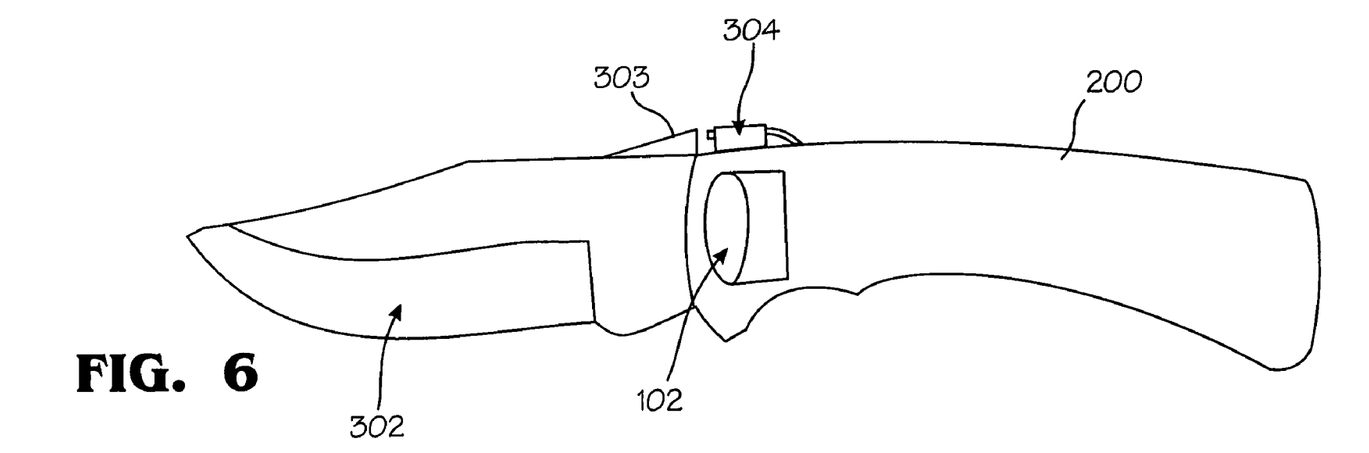
FIG. 6 is a view of the folding knife light tool showing a push button switch that can be switched on by a user or by the knife blade in the open position.

Referring to FIGS. 5, 5B, and FIG. 1 a waterproof battery 105 compartment 107 is provided. Any of several high density batteries available in the commercial market can be used including lithium, alkaline, and the new miniature fuel cells. AAAA batteries newly available are easily packaged within the confines of the housing 200 together with the spring locking mechanisms, a tool port, and an accessory tool 206 accommodated in the tool port 205.

In another embodiment of the invention, the momentary on switch 304 and the mode switch 301 are collocated at the battery compartment 107 end of the housing. This collocated switch 116 combines the functions of both of these switches. The momentary on switch is switched on however by the forward part of the knife blade 302 as the knife blade 302 closes and presses against a cam type actuator 120, or in another embodiment, comes in between a switching magnet and a magnetic reed switch thereby cooperating with said magnet and magnetic reed switch to switch off said magnetic reed switch. In this embodiment a magnetic steel including magnetic stainless steels would be used for the blade 302. This actuator 120 can also be switched on by a thumb switch 114, whether the blade is folded open or closed.

Figure 8:
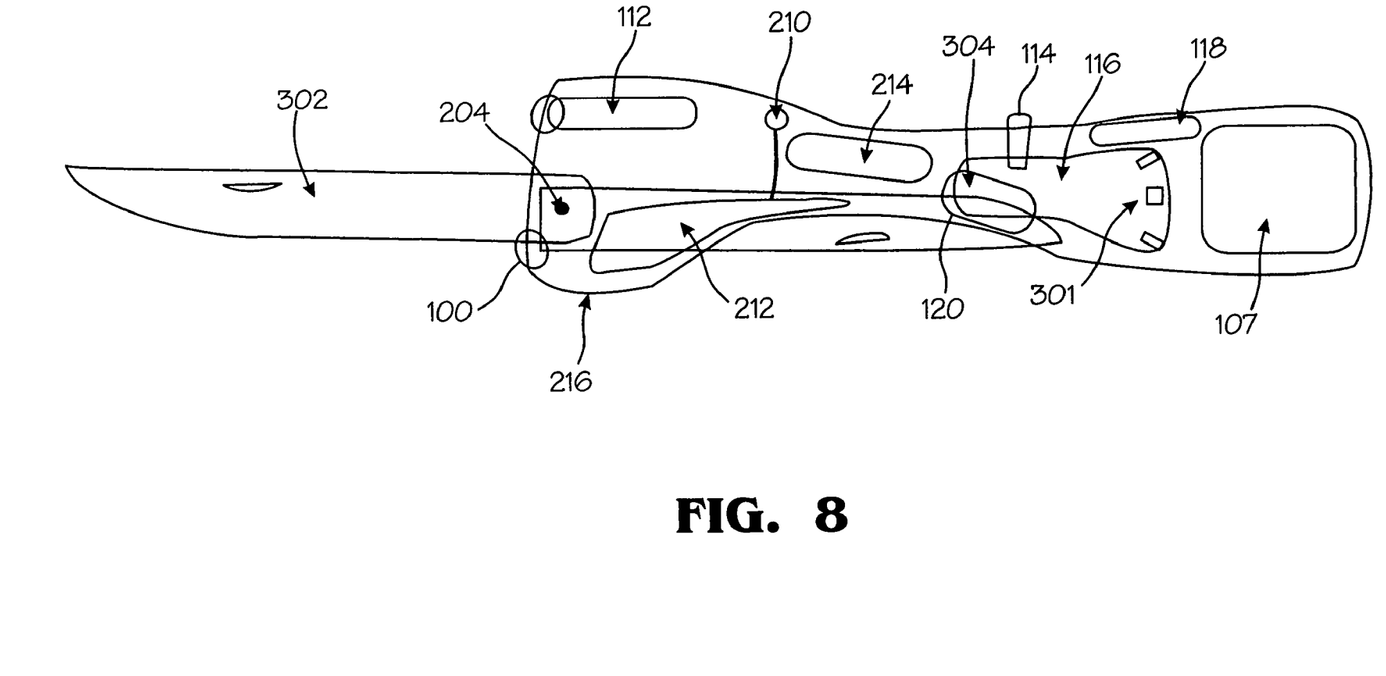
FIG. 8 is a view of a block diagram of the folding knife light tool in an embodiment for Armed Forces use (Military Model) which includes an on-by-blade sonic alarm and a laser light package for use with the Army's MILES training system.

In a military embodiment of the invention FIG. 8 several packages are added and the housing 200 is modified to accommodate the features added. A sonic alarm package 214 that cooperates with the US Army's MILEs training is switched on at the same time as the illumination component 100. The Sonic package 214 is powered by one or more dry cell batteries installed within battery compartment 107. A laser package 112 and an RF package 118 that are also MILEs compatible can also be incorporated. Theses added packages; sonic 214, laser 112, and RF 118 are all powered by the batteries in the battery compartment 107. U.S. Pat. No. 5,474,452 issued to Campagnuolo and assigned to the US Government, as represented by the Secretary of the Army, is incorporated herein for information about the MILEs system. Basically the laser, sonic, and RF packages when received by devices carried on a harness worn by a soldier during training register as "hits" and/or "kills" and assist in scoring the capabilities of units in training. Another version of the militry model would be an actual offensive type weapon carried by special forces and would include a quick-release mechanism for the blade 302. A quick-release button 210 on this commando model would allow one handed operation of the invention for combat purposes. In the weapon model, the quick-release button must be depressed to unlock the blade 302 so to fold the blade 302 back into the housing 200. Additionally the MILEs packages 112, 214, and 118 are not necessary except for training, and need not be included in the commando model. In a further development, a medical model is embodied in a design comprising a quick release mechanism and an illumination feature for used by surgeons who need to open knives with one hand during combat medical procedures.

A unique feature of the invention is the three way mode switch installed during manufacture of the tool by incorporating the mode switch to allow the user to manually switch between three modes of operation: and electrically OFF state where no electrical energy from the batteries is supplied to the source of illumination, an electrical ON state where the electrical energy from the batteries is applied to the source of illumination (e.g., across the filament of a light bulb or across the semiconductor junction of a light emitting diode), and an electrical ON-BY-BLADE state where the state of the mode switch enables the movement of the blade, or one tool, from storage within the handle of the housing to a deployed and functionally operable position, for example, with the blade of a knife extending distally outwardly from the handle, or the tip of a screwdriver extending distally outwardly from the handle to engage the heads of threaded fasteners. The mode switch provides the capability to turn the light on without the knife being opened. The mode switch also provides the feature of being able to open the knife without any light coming on. By leaving the knife mode switch in the on-by-blade position, the light goes on and off by opening and closing the blade without ever having to touch a switch.

A tool port is provided for attaching an accessory tool or tools to the knife housing. The tools attached can be one or two of a variety available in multiuse tool knifes today, for example: tweezers, scissors, razors, scalpels, picks, forks, spoons, and especially a standard hexagon driver tool. A variety of other common and uncommon tools can be utilized depending upon the specific need.

In one embodiment of the invention, the actual heel of the blade is provisioned with a contact washer that cooperates with a contact stud in the handle housing to complete an electrical circuit when the blade is in an open position, a contact plate fixed to the blade makes contact with another contact stud in the handle and thereby turns on the light or illumination by its' switch action. In a related embodiment the heel of the blade is provisioned with a semi-circular conductive washer around the pivot point whereby when the blade is in an open position, two barbed contact studs attached to the housing handle contact the conductive semi-circle and complete an electrical circuit to switch on the light, when the blade is in a closed or folded position, the two barbed contact studs rest on a non-conductive washer located under the semi-circular conductive washer. The blade itself can be the conductive switch part which turns the light on when the blade is opened. This switching could be accomplished by incorporating all of the features on a wiring board or printed circuit board or other available electronic packaging means.

In a further embodiment of the invention the momentary on switch and the three way mode switch, are provided as one switch assembly at the battery supply end of the knife housing wherein the switch assembly performs the same function as the two separate switches. The momentary on switch is switched however by the forward end of the blade as it comes to a closed position and switches off the momentary on switch. Both the two switch embodiment and the combined switch embodiment contain a momentary on button for the thumb or finger of the user to be able to switch ON the light when the blade is in a closed position. The thumb switch buttons are able to switch on the light or switch off the light, in the ON-by-blade position of the three way position switch. In addition, the thumb switch buttons can dim and or switch in another color of illumination by switching to different LED's for example. Dimming would be accomplished by switching in a resistor or other passive or active electronic component standard in the industry.

In another embodiment of the folding knife light tool called the military model, a sonic package to cooperate with a MILE's training system is incorporated. The sonic package emits an acoustic signature compatible with the MILE's system to indicate a hit or a "kill" on the MILE's device worn by a soldier in training. In addition an RF package can be added to communicate with another version of the MILE's system. Also a laser light package can be installed on the folding knife to register a hit or kill on the wearer of a MILE's harness. The sonic, RF, and Laser packages are all controlled by the toggle switch of the folding knife. The housing of the military model is more elongate and of a larger diameter to handle the extra functions, all of which do not need to be present at the same time, that is, some models may only have the sonic package, etc. A training version of the military model can be provisioned without a blade or with a rubber blade for training purposes, especially with a quick release opening mechanism. The military model can also be used as a commando knife with all of the features of the folding knife and with one embodiment having the switchblade mechanism and a switchblade pushbutton to suddenly release the blade to an open position thereby startling an enemy. The elongated handle in this embodiment has a hammer feature at the blade end that can be useful in hand to hand combat, especially with the knife blade extended. This model would only be available as an issued weapon to combatants or to trainees as a training version. Reference is made to U.S. Pat. No. 5,474,452 issued to Campagnuolo and assigned to the US Government, as represented by the Secretary of the Army, for information about the MILE's system. In the weapon model, the pushbutton switch must be pushed to release the knife blade which is locked open so that the blade can be folded back into the handle. This action also turns off the laser light, sonic alarm system, a first illumination component, and the laser and a radio frequency (i.e., RF) packages if installed. Turning the three way mode switch to the OFF position also opens, that is, turns off the application of electrical power to all systems.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A folding knife light, comprising:
   a tool;
   a housing encasing said tool while said tool is in an inoperative position and providing a handle while said tool is in a deployed position;

an illuminating component mounted on said housing to illuminate said tool while said tool is in said deployed position;
a mode switch component; and
a blade switch component comprising an electrical switch activated by movement of said tool between said inoperative position and said deployed position, cooperating with said mode switch component, said housing, and said illuminating component to operate said illuminating component.

2. The folding knife light of claim 1, with said housing comprising said handle accommodating a mode switch component, said blade switch component and at least one illuminating component.

3. The folding knife light of claim 2, with said housing comprising at least one storage volume.

4. The folding knife light of claim 1, with said housing comprising at least one scale and at least one axle providing a pivot of rotation enabling rotation of said tool about said pivot as said tool moves between said inoperative position and said deployed position.

5. The folding knife light of claim 1, with said housing comprising at least one port for accommodating removable storage of any of a variety of tool items selected from among a group comprised of forks, spoons, razors, picks, scissors, flints, and a threaded fastener driver.

6. The folding knife light of claim 1, comprised of at least one extra tool removably stored within said housing.

7. The folding knife light of claim 1, wherein said illuminating component comprises at least one light emitting diode, at least one lens, and at least one reflector.

8. The folding knife light of claim 1, wherein said illuminating component comprises at least one light bulb.

9. The folding knife light of claim 1, wherein said illuminating component comprises a pair of light bulbs, one on each side of a blade when said blade is unfolded from said housing.

10. The folding knife light of claim 1, comprising said electrical switch contained in said handle.

11. The folding knife light of claim 1, with said mode switch comprised of three modes:
an off mode wherein no electrical power is supplied to said electrical switch wherein said illuminating component remains unlit;
an on mode wherein said illuminating component operates independently of said position; and
an on-by-blade mode wherein electrical power is supplied to said electrical switch and said illuminating component operates when said tool is in said deployed position.

12. The folding knife light of claim 1, with said mode switch comprising a single pole, double throw, center off switch.

13. The folding knife light of claim 1, comprised of said electrical switch being switched on by a heel of said tool when said tool moves to said deployed position and when said mode switch is in an on-by-blade position with electrical power supplied to said electrical switch, whereby said illuminating component is lit.

14. The folding knife light of claim 1, comprised of said electrical switch disposed to accommodate manual operation by a thumb of a user when said tool is in said inoperative position.

15. The folding knife light of claim 1, comprised of said electrical switch mounted on said housing with an operational disposition that is switched to an off position by a heel of said tool when said tool is in said inoperative position.

16. The folding knife light of claim 1, with said housing comprising an electrical battery and electrical conductors that electrically connect said battery to said illuminating component via said mode switch and said blade switch component.

17. The folding knife light of claim 1, wherein said mode switch component and said blade switch component comprise a switch assembly borne by one end of the housing and switched to an off position when said tool is in said inoperative position, said switch assembly being switched on when said tool is in said deployed position, said switch assembly being switched on by manipulation of a user when said tool is in said deployed position, and said switch assembly being switched to an off position with no power supplied to said illuminating component when said tool is moved to said inoperative position.

18. The folding knife light of claim 1, with said electrical switch comprising a conductive plate fixed to said tool, and stud contacts affixed to said handle cooperating with said conductive plate to complete an electrical connection from said illuminating component to said mode switch when said tool is in said deployed position.

19. The folding knife light of claim 1, comprised of said blade switch and said mode switch incorporated into one switch assembly in said housing, wherein said switch assembly is switched off by said tool moving to said inoperative position, and comprised of another mechanism cooperating with said switch assembly to momentarily switch on said mode switch and apply electrical power to said illuminating component independent of the position of said tool.

20. The folding knife light of claim 19, comprising a non-conductive washer under a conductive plate preventing electrical contact between said illuminating component and said mode switch when said blade is in a closed position.

21. A folding knife light of claim 1, wherein said mode switch and said blade switch components further comprise a momentary switch comprising a dimming function and a color switching function for dimming said illuminating component and for switching to another color of illumination.

22. A folding knife light, comprising:
a housing enclosing said knife light tool;
a knife light illuminating means for illuminating a blade area;
a laser light package emitting laser light pulses;
a toggle on switch for momentarily turning on said knife light tool illuminating means;
a sonic alarm cooperating with said toggle on switch;
a mode switch for selecting a mode of operation of said knife light tool;
a power supply package for powering said knife light tool;
a switchblade mechanism for rapidly deploying a blade on said folding knife light tool; and
a pushbutton switchblade switch for initiating said deploying a blade.

23. A folding knife light, comprising:
a housing enclosing a knife light tool comprising a blade;
a knife light disposed to illuminate said blade;
a momentary on switch momentarily turning on said knife light;
a mode switch selecting a mode of operation of said knife light;
a power supply package powering said knife light tool;
a switchblade mechanism rapidly deploying said blade from said housing;
a pushbutton switchblade switch initiating said deploying of said blade; and an elongated ergonometric handle with a hammer head at an end of said handle.

24. A folding knife light, comprising:
a housing enclosing a tool;
a knife light disposed to illuminate an area of said tool;
a toggle on switch momentarily turning on said knife light;
a mode switch disposed to select a mode of operation of said knife light;
a power supply package powering said knife light;
a switchblade mechanism disposed to make a rapid deployment of said tool from said housing;
a pushbutton switchblade switch initiating said deployment of said tool; and
an elongated ergonometric handle with a hammer head at one end of said handle.

25. The folding knife light of claim 21, comprising a laser light package, a sonic alarm, and an RF package.

26. The folding knife light of claim 24, wherein said switch blade mechanism is a push button mechanism.

27. A folding knife light, comprising:
a housing;
a quick-release mechanism triggering deployment of a tool from said housing;
an on-by blade light wherein a tip of said tool is illuminated when said tool is a quick release mechanism comprising a blade suitable for surgery allowing single handed operation of said folding knife light tool under extreme conditions; and
a mode switch comprising:
an on feature providing illumination from said light under all conditions and providing illumination when manually toggled on momentarily;
an off feature preventing said light from providing illumination under all conditions;
an on feature providing illumination from said light under all conditions and providing illumination when manually toggled on momentarily;
an off feature preventing said light from providing illumination under all conditions.

28. A folding knife light, comprising:
a tool;
a housing encasing said tool while said tool is in an inoperative position and providing a handle for said tool while said tool is in a deployed position;
a light mounted on said housing and disposed to illuminate said tool while said tool is in the deployed position;
a first electrical switch contained in said handle and activated by movement of said tool to said deployed position; and
a mode switch comprised of three modes:
an off mode with no electrical power supplied to the first electrical switch wherein said light remains unlit;
an on mode wherein said light operates independently of said position; and
an on-by-blade mode wherein electrical power is supplied to said first electrical switch and said light is lit when said tool moves into said deployed position.

29. A process of manufacturing a folding tool, comprising:
installing a tool to rotate about an axle within a housing encasing said tool while said tool is in an inoperative position and providing a handle while said tool is in a deployed position;
mounting an illuminating component on said housing to illuminate said tool while said tool is in said deployed position;
installing a mode switch component; and
electrically connecting a blade switch component comprising an electrical switch activated by movement of said tool between said inoperative position and said deployed position, to operationally cooperate with said mode switch component, said housing, and said illuminating component to operate said illuminating component.

* * * * *